United States Patent
Inayama

(10) Patent No.: US 7,705,494 B2
(45) Date of Patent: Apr. 27, 2010

(54) ELECTRIC MOTOR

(75) Inventor: Hirohide Inayama, Nara (JP)

(73) Assignee: JTEKT Corporation, Osaka (JP)

( * ) Notice: Subject to any disclaimer, the term of this patent is extended or adjusted under 35 U.S.C. 154(b) by 267 days.

(21) Appl. No.: 11/798,229

(22) Filed: May 11, 2007

(65) Prior Publication Data

US 2007/0262659 A1  Nov. 15, 2007

(30) Foreign Application Priority Data

May 12, 2006  (JP) .............................. 2006-134082

(51) Int. Cl.
*H02K 1/14* (2006.01)

(52) U.S. Cl. ........... 310/44; 310/216.067; 310/216.114; 310/254.1

(58) Field of Classification Search ................... 310/43, 310/116–118, 254, 44, 216.004, 216.067, 310/216.114
See application file for complete search history.

(56) References Cited

U.S. PATENT DOCUMENTS 6,087,755 A * 7/2000 Suzuki et al. ............... 310/254

6,181,041 B1 * 1/2001 Nose .......................... 310/164
6,492,749 B1 * 12/2002 Shiga et al. ................... 310/43
2003/0160532 A1   8/2003 Suzuki et al.

FOREIGN PATENT DOCUMENTS

| JP | 2002-369418 | 12/2002 |
|---|---|---|
| JP | 2003-88027 | 3/2003 |
| JP | 2004-201483 | 7/2004 |
| JP | 2005-304202 | 10/2005 |
| JP | 2006-81250 | 3/2006 |
| WO | WO 2005/101612 A1 | 10/2005 |
| WO | WO 2005/109603 A1 | 11/2005 |

* cited by examiner

*Primary Examiner*—Burton Mullins
(74) *Attorney, Agent, or Firm*—Rabin & Berdo, PC

(57) ABSTRACT

An electric motor includes an annular stator core having a pair of ends opposed to each other in an axial direction, and a coil wound around the stator core. The stator core includes a pair of powder magnetic cores each arranged at the pair of ends and a laminated steel plate arranged between the paired powder magnetic cores. Each of the paired powder magnetic cores includes a section arranged outside the coil in the axial direction.

3 Claims, 5 Drawing Sheets

ELECTRIC MOTOR

BACKGROUND OF THE INVENTION

1. Field of the Invention

The present invention relates to an electric motor.

2. Description of Related Art

Conventional electric motors have annular stators. The stator has an annular stator core around which a coil is wound. The stator core is composed of a laminated steel plate. The laminated steel plate is an assembly obtained by laminating a number of silicon steel plates in an axial direction of the stator. In some cases, the stator core may be composed of a powder molding including a powder magnetic material and obtained by compression molding. Further, in some cases, the stator core may be composed of an assembly of a laminated steel plate and the powder molding described above (e.g., Japanese Unexamined Patent Publication No. 2002-369418).

When the stator core is composed of the laminated steel plate, however, the outer shape of the stator core is a round pillar shape. The coil projects from both ends of the stator core in the axial direction. As a result, an empty space occurs around the coil. On the other hand, in the stator core composed of the laminated steel plate, flexibility of the shape of the stator core is low in a lamination direction corresponding to the axial direction of the stator core. Therefore, the empty space that occurs around the coil cannot be solved. Consequently, a magnetic flux is not effectively utilized, so that the output torque of the electric motor is reduced. Conversely, an attempt to increase the output torque increases the electric motor in size.

When the stator core is composed of the above-mentioned powder molding, the flexibility of the shape is high, while the manufacturing cost is high.

In the foregoing document, powder moldings are each arranged at both ends of the laminated steel plate in an axial direction of the stator core. Since a coil is wound in a state where the coil projects in the axial direction of the stator core from the powder molding, an empty space described above occurs around the coil. As a result, the output torque is reduced.

An object of the present invention is to provide a low-cost electric motor that can be inhibited from increasing in size and can increase output torque.

SUMMARY OF THE INVENTION

In order to attain the above-mentioned object, a preferred aspect of the present invention provides an electric motor comprising an annular stator core having a pair of ends opposed to each other in an axial direction and a coil wound around the stator core. The stator core includes a pair of powder magnetic cores each arranged at the pair of ends and a laminated steel plate arranged between the paired powder magnetic cores. Each of the paired powder magnetic cores includes a section arranged outside the coil in the axial direction.

According to the present aspect, a low-cost laminated steel plate is used, so that the manufacturing cost can be reduced. Moreover, the powder magnetic core whose shape has a high flexibility is arranged at each of the ends in the axial direction of the stator core, so that the shape at the end of the stator core can be freely set. Consequently, an empty space that has conventionally occurred at the end in the axial direction of the stator core can be suppressed to a small size. As a result, a magnetic flux can be effectively utilized. Consequently, it is feasible to increase the output torque of the electric motor at low cost while inhibiting the size of the electric motor from increasing.

Specifically, a part of each powder magnetic core is arranged outside the coil in the axial direction of the stator core, so that the length of a portion of the stator core opposed to a magnet in a rotor to directly contribute to the production of the output torque can be increased. As a result, the output torque can be increased.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

An electric motor according to an embodiment of the present invention will be described in detail while referring to the accompanying drawings.

Figure 1:
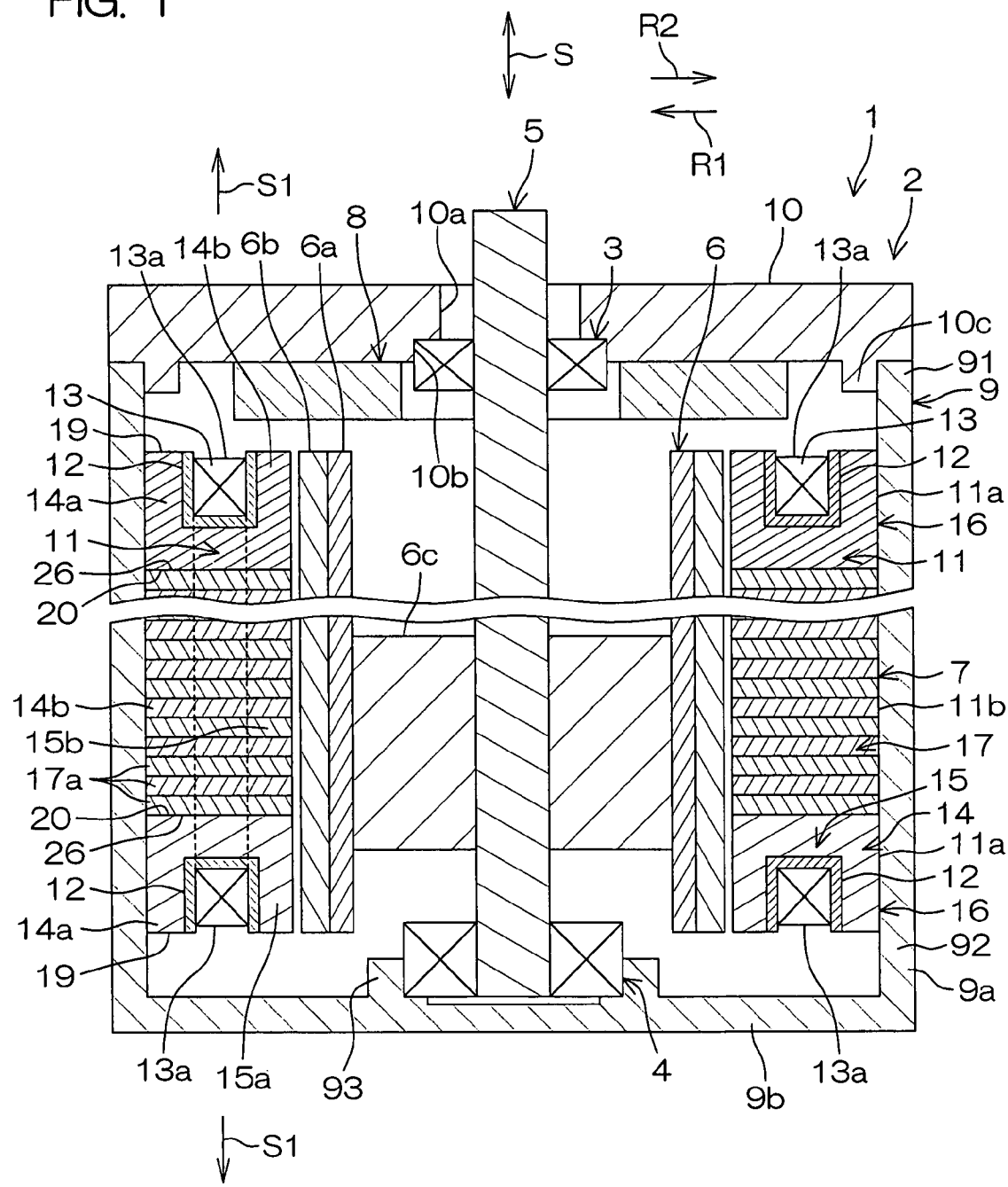
FIG. 1 is a cross-sectional view showing the schematic configuration of an electric motor according to a first embodiment of the present invention.

FIG. 1 is a cross-sectional view showing the schematic configuration of an electric motor according to a first embodiment of the present invention.

Referring to FIG. 1, the electric motor 1 comprises a housing 2, first and second bearings 3 and 4 held by the housing 2, and an output shaft 5 rotatably supported by the first and second bearings 3 and 4. The electric motor 1 has a cylindrical rotor 6 provided so as to rotate along with the output shaft 5 and a cylindrical stator 7 fixed in the housing 2 so as to be opposed to the rotor 6 in a radial direction.

The electric motor 1 is a blushless motor. Further, the electric motor 1 has a position detection sensor (not shown) that detects a rotation angle of the rotor 6 and a connecting substrate 8 called a bus bar for electrical connection inside the blushless motor.

The housing 2 has a housing main body 9 having a closed-end cylindrical shape and an annular end member 10 mounted on an open end of the housing main body 9.

A through hole 10a is formed at the center of the end member 10. A supporting section 10b for supporting the first bearing 3 is provided on the inner periphery of the through hole 10a. The substrate 8 is fixed to the end member 10 so as to surround the through hole 10a. Further, the end member 10 is provided with a cylindrical projection 10c for connection to the housing main body 9.

The housing main body 9 has a cylinder 9a and a bottom 9b serving as an end member. The cylinder 9a and the bottom 9b are integrally formed of a single member.

The cylinder 9a has an inner periphery and an outer periphery. Further, the cylinder 9a has a first end 91 on the open side and a second end 92 close to the bottom 9b. The cylindrical projection 10c of the end member 10 is fitted in the first end 91 of the cylinder 9a. The first end 91 of the cylinder 9a and the end member 10 are fixed to each other with a bolt (not shown). A supporting cylinder 93 for supporting the second bearing 4 is provided at the center of an inner surface of the bottom 9b.

The housing 2 internally accommodates the rotor 6 and the stator 7. The stator 7 is arranged between the end member 10 and the bottom 9b. The outer periphery of the stator 7 is fixed to the inner periphery of the cylinder 9a.

The output shaft 5 is composed of a elongated member. One end of the output shaft 5 extends from the through hole 10a in the end member 10. The other end of the output shaft 5 is accommodated in the housing 2. The output shaft 5 is arranged concentrically with the inner periphery of the cylinder 9a and the inner periphery of the stator 7 in the housing 2.

The rotor 6 is fixed concentrically with the output shaft 5 to rotate along with the output shaft 5. The rotor 6 takes a cylindrical shape and has an outer periphery and an inner periphery. The rotor 6 includes a rotor main body 6a, a rotor magnet 6b attached to the outer periphery of the rotor main body 6a such that it can rotate along with the rotor main body 6a, and a cylindrical spacer 6c interposed between the rotor main body 6a and the output shaft 5.

The rotor magnet 6b is composed of a permanent magnet and is formed in an annular shape. N and S magnetic poles are alternately arranged in a circumferential direction and formed at a plurality of positions on the outer periphery of the rotor magnet 6b.

The rotor main body 6a is a thin-walled annular member, and is formed separately from the rotor magnet 6b and the output shaft 5. The outer periphery of the rotor main body 6a is fitted in and fixed to the inner periphery of the rotor magnet 6b. The inner periphery of the rotor main body 6a is fixed to the outer periphery of the output shaft 5 through the spacer 6c.

The stator 7 takes an annular shape and is arranged coaxially with the rotor 6. The inner periphery of the stator 7 is opposed to the outer periphery of the rotor magnet 6b in the rotor 6 with predetermined spacing.

The stator 7 has a single stator core 11 taking an annular shape, a plurality of insulators 12, and a plurality of coils 13. The outer periphery of the stator core 11 forms the outer periphery of the stator 7, and is fitted in the inner periphery of the cylinder 9a of the housing main body 9.

Figure 2:
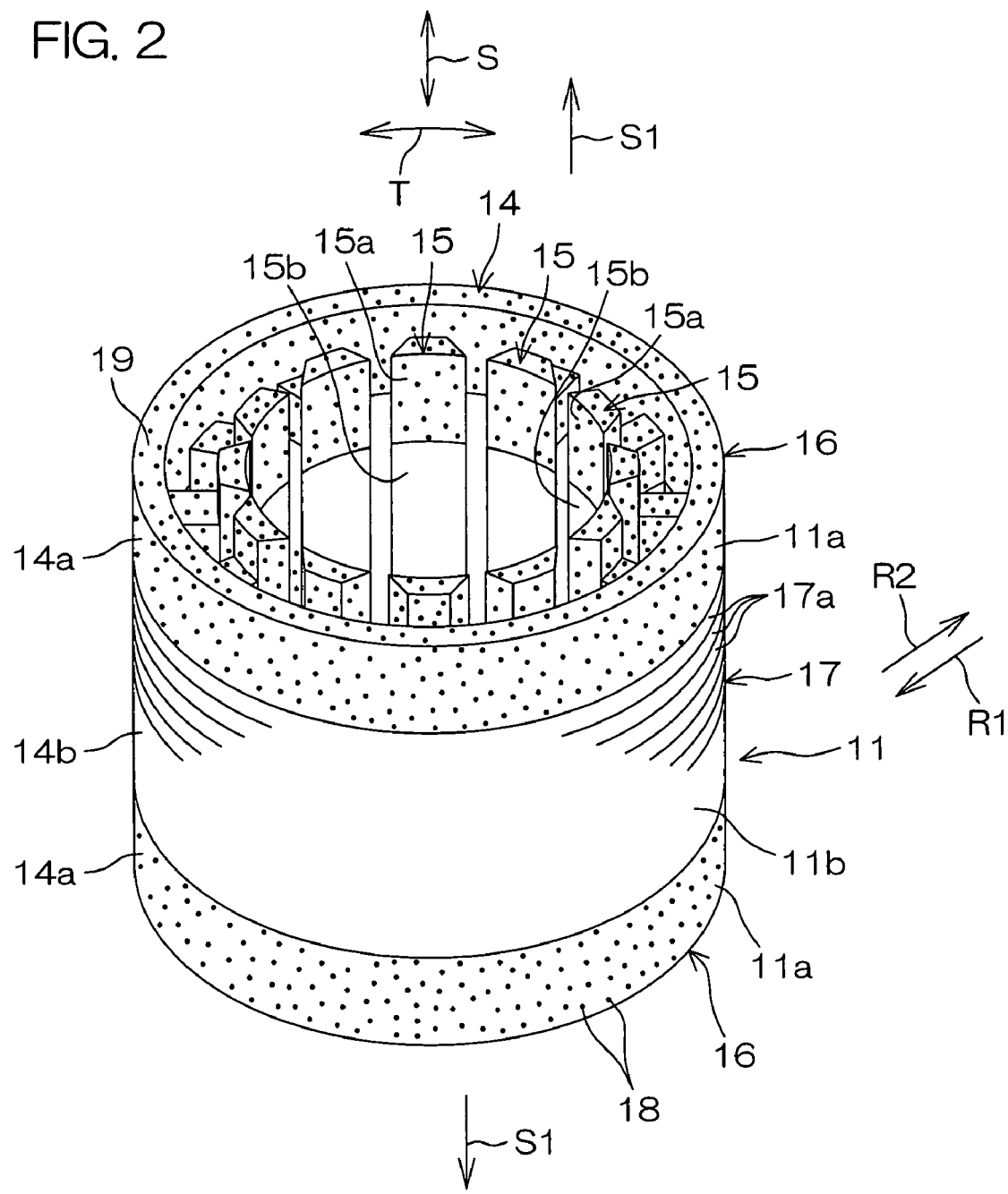
FIG. 2 is a perspective view of the stator core shown in FIG. 1.
Figure 3:
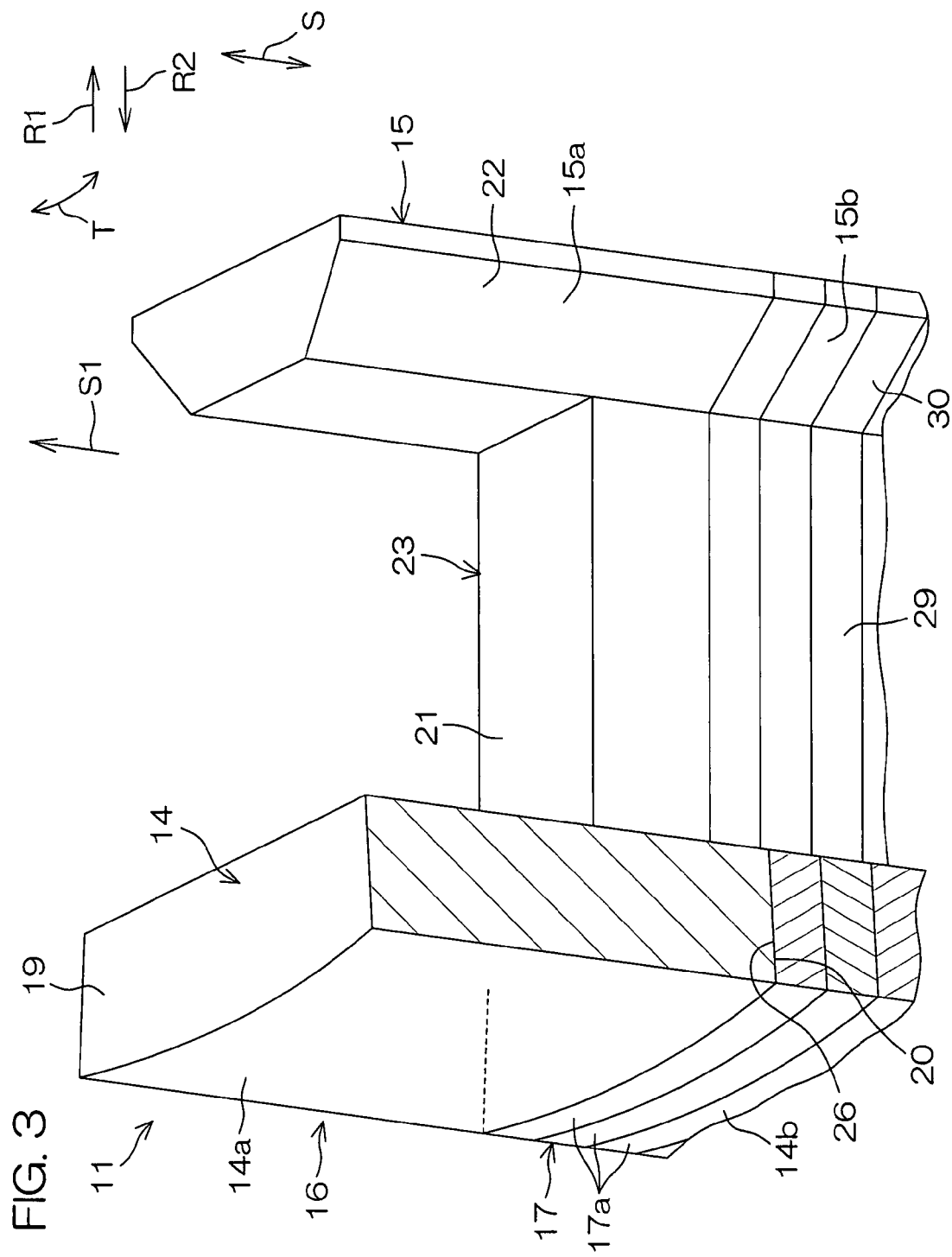
FIG. 3 is a partially sectional view of a principal part of the stator core shown in FIG. 2.
Figure 4:
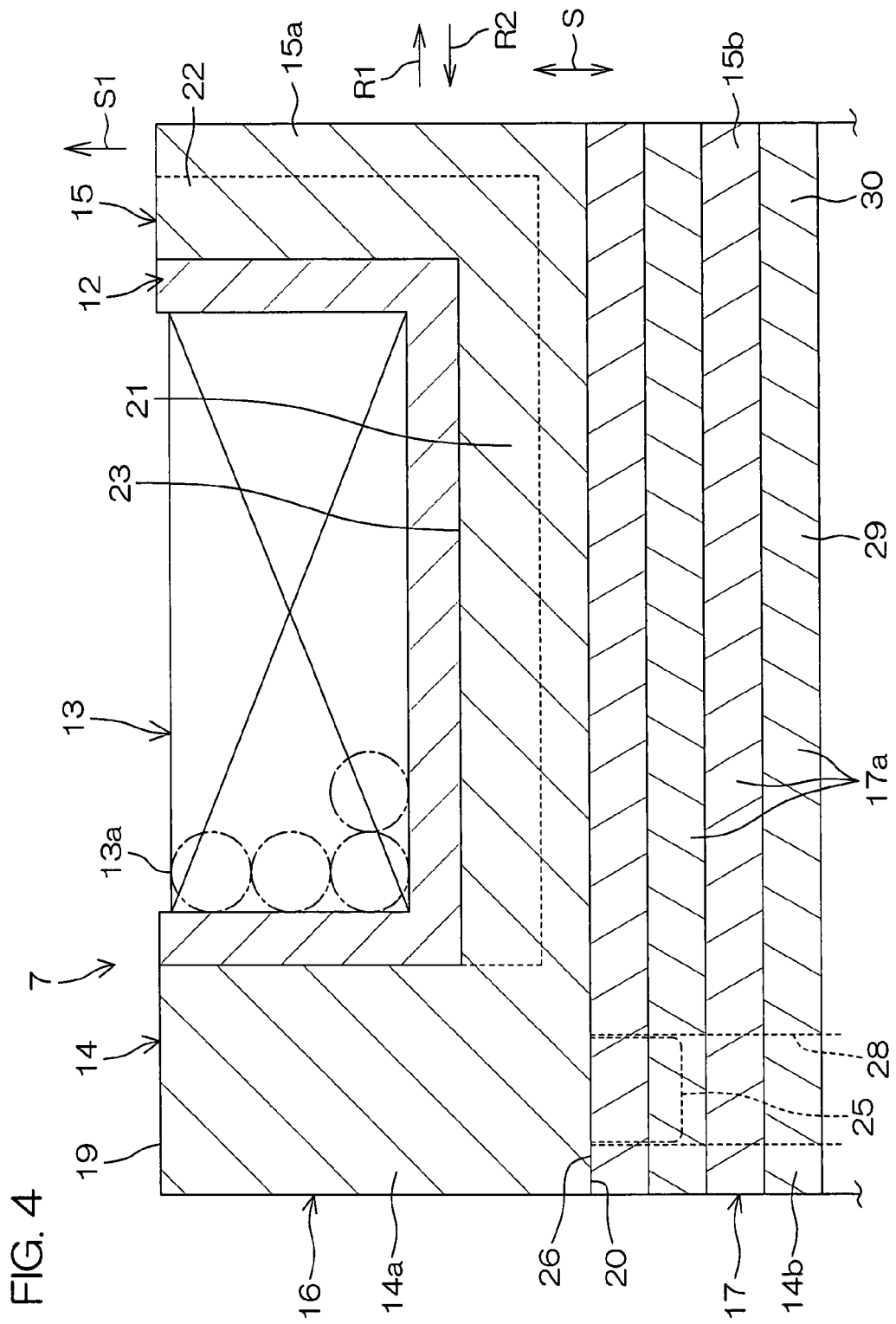
FIG. 4 is a cross-sectional view of a principal part of the stator shown in FIG. 1.

FIG. 2 is a perspective view of the stator core 11 shown in FIG. 1. FIG. 3 is a partially sectional view of a principal part of the stator core 11 shown in FIG. 2. FIG. 4 is a cross-sectional view of a principal part of the stator 7 shown in FIG. 1.

Referring to FIGS. 1 and 2, the stator core 11 has a yoke 14 taking a cylindrical shape and a plurality of teeth 15 connected so as to project from the inner periphery of the yoke 14.

The plurality of teeth 15 take the same shape each other, and are formed so as to project from the inner periphery of the yoke 15. The plurality of teeth 15 are uniformly spaced in a circumferential direction T of the stator core 11, and are opposed to the rotor 6.

Referring to FIG. 1, two of the insulators 12 are each assembled to both ends of each of the plurality of teeth 15 in an axial direction S of the stator core 11. The insulator 12 is an insulating member for protecting the coil 13. Further, the coil 13 is wound around the teeth 15 through each of the two insulators 12. Each of the coils 13 has an insulated and covered electric wire.

The stator core 11 in the present embodiment has a pair of powder magnetic cores 16 each arranged at a pair of ends 11a of the stator core 11 and a laminated steel plate 17 serving as a single unit arranged between the paired powder magnetic cores 16. That is, the stator core 11 is configured with the laminated steel plate 17 interposed between the paired powder magnetic cores 16 opposed to each other in the axial direction S.

Similarly, the yoke 14 is configured by combining a pair of first sections 14a opposed to each other in the axial direction S of the stator core 11 and a second section 14b arranged between the paired first sections 14a.

Similarly, each of the teeth 15 is configured by combining a pair of first sections 15a opposed to each other in the axial direction S of the stator core 11 and a second section 15b arranged between the paired first sections 15a.

In the yoke 14, the pair of first sections 14a and the second section 14b take the same pillar shape, as viewed from the axial direction S of the stator core 11.

In the teeth 15, the pair of first sections 15a and the second section 15b take the same shape, as viewed from the axial direction S of the stator core 11.

Furthermore, a surface opposed to the rotor 6 of each of the teeth 15 continuously extends straight in the axial direction S. The length of each of the teeth 15 is made equal to the length of the rotor magnet 6b in the axial direction S of the stator core 11. The opposed surface of the teeth 15 and the rotor magnet 6b are arranged at the same position each other in the axial direction S.

The paired powder magnet cores 16 take the same shape, and are arranged reverse to each other in the axial direction S. Each of the powder magnetic cores 16 includes magnetic powder 18 (only a part is illustrated), and is composed of a sintered body serving as a powder molding formed using the magnetic powder 18.

Each of the powder magnetic cores 16 includes the first section 14a in the yoke 14 and the first section 15a in the plurality of teeth 15. The first section 14a in the yoke 14 and the first section 15a in the plurality of teeth 15 are integrally formed to form a single component.

Furthermore, each of the powder magnetic cores 16 has a first end surface 19 facing outward in the axial direction S of the stator core 11 (corresponding to a direction S1 away from the laminated steel plate 17) and a second end surface 20 on the opposite side of the first end surface 19.

The laminated steel plate 17 includes the second section 14b in the yoke 14 and the second section 15b in the teeth 15.

The paired ends 11a of the stator core 11 in the axial direction S are similarly formed each other. Referring to FIGS. 3 and 4, description is made in conformity with the powder magnetic core 16 at one of the ends 11a of the stator core 11.

The first section 15a in each of the teeth 15 has a teeth main body 21 connected to the inner periphery of the first section 14a in the yoke 14 and extending inward in a radial direction of the stator core 11 from the inner periphery and a bulge 22 provided at an end in a radially inward direction of the teeth main body 21.

The bulge 22 bulges out in a predetermined length outward in the axial direction S of the stator core 11 (corresponding to the direction S1) from the teeth main body 21, and bulges out in a predetermined length toward both the sides in the circumferential direction T of the stator core 11. The bulge 22 is formed such that the wall thickness (the size in the radial direction) decreases as the distance from the end in the radially inward direction R1 of the teeth main body 21 increases in the circumferential direction T of the stator core 11. The bulge 22 is formed in a length equal to that of the first section 14a in the yoke 14 in the axial direction S of the stator core 11.

The first end surface 19 of the powder magnetic core 16 has a portion formed in the first section 14a in the yoke 14 and a portion formed in the bulge 22 in the first section 15a in the teeth 15. Further, a coil accommodating groove 23 is formed between the two portions. The coil accommodating groove 23 is opened outward in the axial direction S (corresponding to the direction S1). The coil accommodating groove 23 accommodates the coil 13 through the insulator 12. The coil 13 is wound so as not to project outward in the axial direction S of the stator core 11 (corresponding to the direction S1) from the coil accommodating groove 23.

A second end surface 20 of the powder magnetic core 16 forms a single plane perpendicular to the axial direction S of the stator core 11. That is, the second end surface 20 has a portion formed in the first section 14a in the yoke 14, a portion formed in the teeth main body 21 in the first section 15a in the teeth 15, and a portion formed in the bulge 22 in the first section 15a in the teeth 15. The three portions continue to one another, to form the above-mentioned single plane.

The second end surface 20 is brought into contact with the laminated steel plate 17 opposed to the second end surface 20. Further, the second end surface 20 is provided with a plurality of projections 25 (only one projection is illustrated) serving as connecting sections for connection to a hole 28 serving as a section to be connected in the laminated steel plate 17.

Each of the projections 25 projects in a predetermined length in the axial direction S from the second end surface 20, takes a round pillar shape or a prism shape, and is formed integrally with the second end surface 20. Each of the projections 25 is a portion formed of the first section 14a in the yoke 14 and is arranged at a position spaced apart from the first section 15a in each of the teeth 15 in the circumferential direction T on the second end surface 20. The plurality of projections 25 are spaced apart from one another. The projection 25 may be a pillar-shaped member formed separately from the powder magnetic core 16 and fixed to the powder magnetic core 16. Alternatively, at least one projection may be provided.

Referring to FIGS. 2 and 3, the laminated steel plate 17 is arranged in an intermediate section 11b in the stator core 11 in the axial direction S, and is sandwiched between the paired powder magnetic cores 16. The laminated steel plate 17 is obtained by laminating silicon steel plates 17a (only parts are illustrated) serving as a plurality of electromagnetic steel plates in the axial direction S serving as a lamination direction to form a single unit. Because the density of the steel plate 17 can be increased, the laminated steel plate 17 can easily increase a magnetic flux density and is low in cost.

The laminated steel plate 17 has the second section 14b in the yoke 14 and the second section 15b in the plurality of teeth 15. The sections 14b and 15b are integrally formed. The outer shape of the laminated steel plate 17 is a pillar shape and extends in a predetermined length in the axial direction S. The laminated steel plate 17 serving as a single unit has a pair of end surfaces 26 in the axial direction S. The end surface 26 is opposed to and brought into contact with the second end surface 20 of the powder magnetic core 16.

The second section 15b in each of the teeth 15 has a teeth main body 29 and a bulge 30 provided at an end in the radially inward direction R1 of the teeth main body 29. The teeth main body 29 is connected to the inner periphery of the second section 14b in the yoke 14 and extends in the radially inward direction R1 from the inner periphery.

The bulge 30 bulges out in a predetermined length toward both the sides in the circumferential direction T from the teeth main body 29. The bulge 30 is formed such that the wall thickness (the size in the radial direction) decreases as the distance from the end in the radially inward direction R1 of the teeth main body 29 increases in the circumferential direction.

Referring to FIGS. 3 and 4, each of the paired end surfaces 26 of the laminated steel plate 17 serving as a single unit is formed into a single plane perpendicular to the axial direction S of the stator core 11. That is, each of the end surfaces 26 of the laminated steel plate 17 has a portion formed of the second section 14b in the yoke 14, a portion formed of the teeth main body 29 in the second section 15b in the teeth 15, and a portion formed of the bulge 30 in the second section 15a in the teeth 15. The three portions connect to one another to form the above-mentioned single plane.

The hole 28 serving as the section to be connected to the powder magnetic core 16 is formed on each of the end surfaces 26 of the laminated steel plate 17. The hole 28 extends parallel to the axial direction S, and takes a circular shape or a square shape, as viewed from the axial direction S. A projection 25 in the powder magnetic core 16 is fitted in the hole 28. The hole 28 may penetrate the laminated steel plate 17 serving as a single unit in the axial direction S, and may be formed in a closed-end shape at a predetermined depth larger than the length of the projection 25.

The electric motor 1 in the present embodiment has the stator 7 in an annular shape. The stator 7 includes the pair of powder magnetic cores 16 arranged at both ends 11a in the axial direction S of the stator 7 and the laminated steel plate 17 arranged between the paired powder magnetic cores 16 in the axial direction S of the stator 7. In the axial direction S of the stator 7, each of the first end surface 19 serving as an outward end portion of the corresponding powder magnetic cores 16 is arranged outside of a corresponding outward end portion 13a of the coil 13 wound around the stator 7.

According to the present embodiment, a low-cost laminated steel plate 17 is used for the intermediate section 11b in the axial direction S of the stator core 11, so that the manufacturing cost can be reduced. Moreover, the powder magnetic core 16 whose shape has a higher flexibility is arranged at the end 11a in the axial direction S. Consequently, an empty space that has conventionally occurred at the end 11a can be suppressed to a small size by setting the shape of the powder magnetic core 16. As a result, the magnetic flux can be effectively utilized. Consequently, it is feasible to increase the output torque of the electric motor 1 at low cost while inhibiting the size of the electric motor 1 from increasing.

Particularly, the powder magnetic core 16 extends outward in the axial direction S (corresponding to the direction S1) from the coil 13, so that the length of the stator core 11 serving as a section opposed to the rotor magnet 6b to directly contribute to the production of the output torque can be increased. This is preferable to increase the output torque.

Furthermore, each of the powder magnetic cores 16 has the end surface 19 directed outward in the axial direction S of the stator 7 (corresponding to the direction S1). The coil accommodating groove 23 accommodating the coil 13 to be wound is formed on each of the end surfaces 19 so that the coil 13 does not project outward in the axial direction S from the coil accommodating groove 23.

In the present embodiment, each of the powder magnetic cores 16 includes a connecting section (e.g., corresponding to the projection 25 in the present embodiment) for connecting the laminated steel plate 17 thereto. In this case, when the stator 7 is manufactured, the pair of powder magnetic cores 16 and the laminated steel plate 17 are integrally coupled to each other in a temporarily held state. Therefore, the coil 13 can be easily wound, which contributes to the reduction in the manufacturing cost.

Furthermore, each of the powder magnetic cores 16 and the laminated steel plate 17 serving as a single unit can be connected to each other by fitting the projection 25 in each of the powder magnetic cores 16 in the hole 28 formed in the laminated steel plate 17. Further, it is easy to provide each of the powder magnetic cores 16 with the projection 25 and form the hole 28 in the laminated steel plate 17, which allows to suppress the rise in the manufacturing cost.

If the coil wound around the stator core projects outward in the axial direction of the stator core in such a manner as a conventional electric motor, the variation in the total length of the stator in the axial direction increases. On the other hand, in the present embodiment, the total length of the stator 7 is equal to the total length of the stator core 11 in the axial direction S, so that the variation in the total length of the stator 7 can be reduced. As a result, the stator 7 can be arranged at good space efficiency.

A modified example of the present embodiment described below can be considered. In the following description, points different from those in the above-mentioned embodiment will be described, and the same constituent elements are assigned the same reference numerals and the description thereof is omitted.

Figure 5:
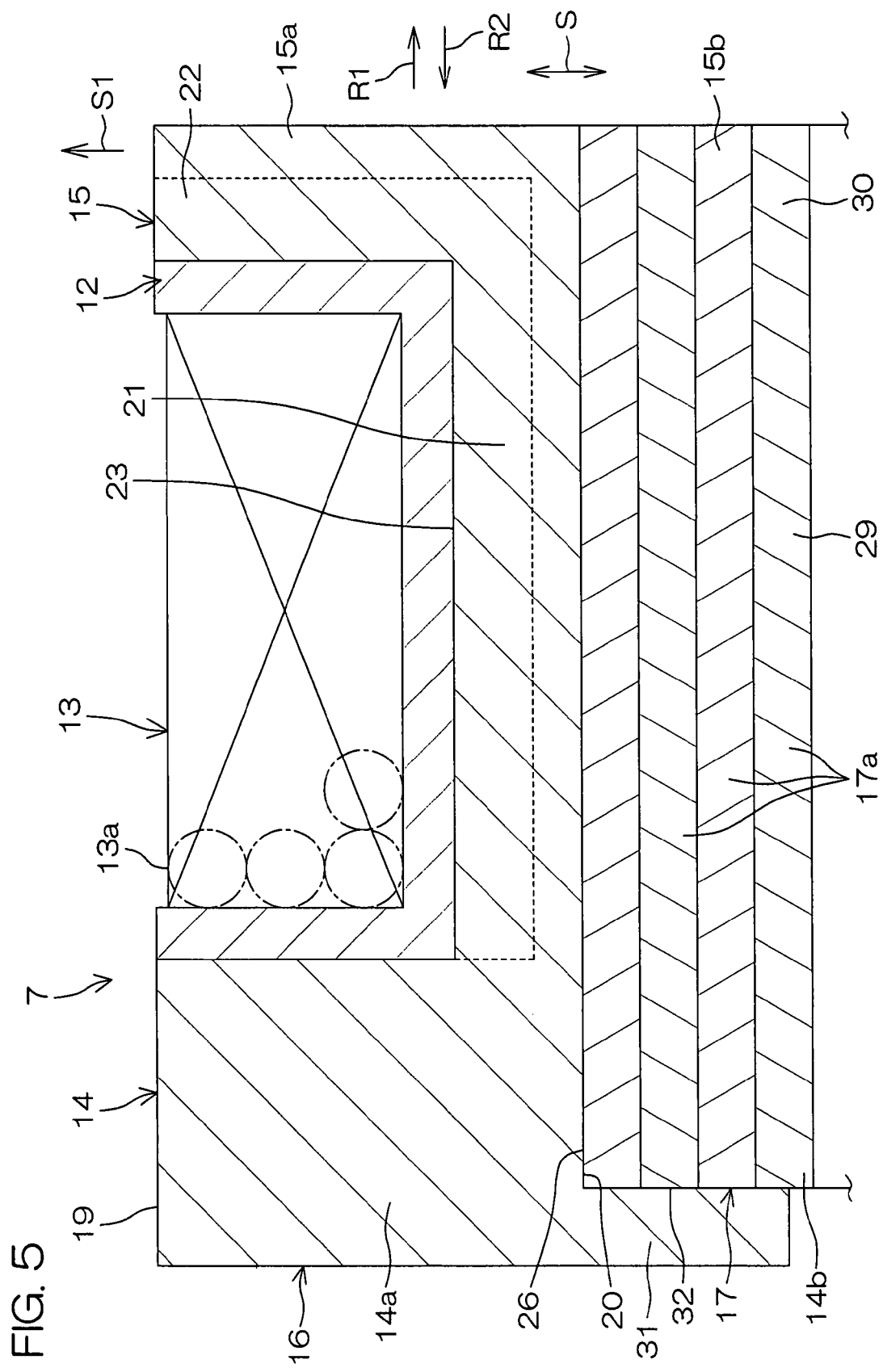
FIG. 5 is a cross-sectional view showing a principal part of a stator in an electric motor according to a second embodiment of the present invention.

FIG. 5 is a cross-sectional view of a principal part of a stator 7 in an electric motor according to a second embodiment of the present invention. Referring to FIG. 5, each of powder magnetic cores 16 has an annular projection 31 serving as a connecting section for connecting a laminated steel plate 17 serving as a single unit thereto. The annular projection 31 projects in an axial direction S from an end surface 20 of the powder magnetic core 16 and extends in a circumferential direction.

On the other hand, the laminated steel plate 17 serving as a single unit includes an outer peripheral edge 32 serving as an end. The inner periphery of the annular projection 31 is fitted in the outer peripheral edge 32 of the laminated steel plate 17 serving as a single unit. That is, in the present embodiment, the annular projection 31 functions as an engagement section that is engaged with the outer peripheral edge 32 of the laminated steel plate 17.

In the present embodiment, the powder magnetic core 16 and the laminated steel plate 17 can be connected to each other by engaging the annular projection 31 serving as the engagement section with the outer peripheral edge 32 of the laminated steel plate 17. In order to achieve the above-mentioned connection, the outer peripheral edge 32 of the laminated steel plate 17 can be utilized, which allows to suppress the rise in the manufacturing cost.

The engagement section in the powder magnetic core 16 may be engaged with the inner periphery of the laminated steel plate 17.

In each of the above-mentioned embodiments, each of the connecting sections may be eliminated.

In each of the above-mentioned embodiments, the stator core 11 may have a plurality of split cores (not shown) obtained by being equally divided in the circumferential direction. In the case, each of the split cores has a pair of powder magnetic cores arranged at both ends 11a in the axial direction S and a laminated steel plate arranged between the paired powder magnetic cores.

As the powder magnetic core, a molding obtained by subjecting magnetic powder to compression molding at a high pressure can be used in addition to a sintered body including magnetic powder. Further, a resin molding can be used. The resin molding includes iron powder serving as magnetic powder and synthetic resin serving as a binder.

Although the present invention has been described in more detail by its specific embodiments, those skilled in the art who have understood the foregoing contents would easily consider its changes, modifications, and equivalents. Therefore, the present invention should be the range of the scope of the claims and the range of its equivalents.

The present application corresponds to a Japanese Patent Application No. 2006-134082 filed with the Japanese Patent Office on May 12, 2006, the entire disclosure of which is hereby incorporated by reference.

What is claimed is:

1. An electric motor comprising:
    an annular stator core having a first end and a second end opposite to the first end in an axial direction, and comprising
        first and second powder magnetic cores, the first powder magnetic core being arranged at the first end, and the second powder magnetic core being arranged at the second end, each of the powder magnetic cores including a cylindrical yoke forming an outer periphery of the stator core, a plurality of teeth main bodies disposed within the cylindrical yoke, a plurality of teeth each being connected to the yoke via a respective one of the teeth main bodies and being disposed radially inward of the yoke, and a core connecting section, the core connecting section including a projection disposed on a surface of the yoke in a region of the outer periphery and adjacent to a respective one of the teeth main bodies, and
        a laminated steel plate forming a single unit and arranged between the first and second powder magnetic cores, each of the powder magnetic cores being connected to the laminated steel plate via the projection fitted in a corresponding hole formed in the laminated steel plate, the hole being disposed adjacent to the respective teeth main body; and
    a coil wound around the stator core, the cylindrical yoke of each of the powder magnetic cores being disposed outside the coil in the axial direction.

2. An electric motor comprising:
    an annular stator core having a pair of ends opposite to each other in an axial direction, and comprising
        first and second powder magnetic cores, the first powder magnetic core being disposed at the first end, and the second powder magnetic core being disposed at the second end, each of the powder magnetic cores including a core connecting section with an engagement section, each engagement section including a respective annular projection,
        a laminated steel plate forming a single unit, having an annular shape, and being arranged between the powder magnetic cores, so that the annular projections of the respective first and second powder magnetic cores are spaced apart from each other so as to not directly touch each other, each of the powder magnetic cores being connected to the laminated steel plate via the annular projection and being engaged with an outer peripheral edge of the laminated steel plate at an end of the laminated steel plate; and
    a coil wound around the stator core, a section of each of the paired powder magnetic cores being disposed outside the coil in the axial direction.

3. The electric motor according to claim 2, wherein the annular projection extends in the axial direction.

* * * * *